US011428189B1

(12) United States Patent
Tooker et al.

(10) Patent No.: US 11,428,189 B1
(45) Date of Patent: Aug. 30, 2022

(54) PISTON BOWL GEOMETRY, CUFF AND TOP LAND INTERACTION FOR REDUCED HYDROCARBONS, IMPROVED COMBUSTION EFFICIENCY, AND PISTON TEMPERATURE

(71) Applicant: Caterpillar Inc., Peoria, IL (US)

(72) Inventors: Jonathan Kevin Tooker, Whitestown, IN (US); Christopher L. Batta, West Lafayette, IN (US); Dylan S. Fawcett, Peoria, IL (US); Shaun David Fogle, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/318,675

(22) Filed: May 12, 2021

(51) Int. Cl.
| | |
|---|---|
| *F02F 3/00* | (2006.01) |
| *F02F 1/00* | (2006.01) |
| *F16J 10/04* | (2006.01) |
| *F02F 3/28* | (2006.01) |

(52) U.S. Cl.
CPC ............... *F02F 1/004* (2013.01); *F02F 3/28* (2013.01); *F16J 10/04* (2013.01)

(58) Field of Classification Search
CPC . F02F 2001/006; F02F 1/004; F02B 23/0672; F02B 23/0693; F02B 23/0696; F02B 23/0651
USPC ...................................................... 123/193.4
See application file for complete search history.

(56) References Cited

U.S. PATENT DOCUMENTS

| | | | | |
|---|---|---|---|---|
| 4,474,147 | A * | 10/1984 | Hoopes ................ | F16J 15/0881 277/601 |
| 6,167,847 | B1 * | 1/2001 | Ergezen .................... | F02F 1/16 123/41.79 |
| 6,293,245 | B1 * | 9/2001 | Bock ...................... | F16J 15/104 123/198 D |
| 8,978,621 | B2 | 3/2015 | Easley et al. | |
| 9,328,693 | B2 * | 5/2016 | Pierpont ............. | F02B 23/0693 |
| 9,938,925 | B2 | 4/2018 | Morgan et al. | |
| 10,113,503 | B2 | 10/2018 | Bowditch et al. | |
| 2005/0279296 | A1 * | 12/2005 | Coney ....................... | F02F 1/18 123/193.2 |
| 2008/0150237 | A1 * | 6/2008 | Bischofberger .......... | F02F 1/16 277/310 |
| 2013/0319372 | A1 | 12/2013 | Gladden et al. | |

(Continued)

FOREIGN PATENT DOCUMENTS

| | | |
|---|---|---|
| DE | 10137548 A1 | 2/2003 |
| DE | 102007053891 A1 | 5/2009 |

(Continued)

*Primary Examiner* — Long T Tran
*Assistant Examiner* — James J Kim
(74) *Attorney, Agent, or Firm* — Hibshman Claim Construction PLLC (57) ABSTRACT

An anti-polishing ring includes a ring body defining an axis of revolution, and a radial direction that is perpendicular to the axis of revolution, and a circumferential direction about the axis of revolution. The ring body includes an outer circumferential surface, a bottom surface, a top surface, and an inner circumferential surface. The inner circumferential surface defines an inner diameter, the ring body defines a radial thickness measured from the inner circumferential surface to the outer circumferential surface, and a ratio of the radial thickness to the inner diameter ranges from 0.015 to 0.020.

19 Claims, 8 Drawing Sheets

(56) References Cited

U.S. PATENT DOCUMENTS

2016/0053707 A1* 2/2016 Batta .................. F02F 11/005
    123/193.2
2017/0002734 A1* 1/2017 Watanabe .............. F16J 10/04
2018/0266359 A1* 9/2018 Beasley ................ F02F 1/00

FOREIGN PATENT DOCUMENTS

| DE | 102007053966 A1 | 5/2009 |
| DE | 102009043479 A1 | 3/2011 |
| EP | 2103790 B1 | 10/2018 |
| JP | 08240149 A | 9/1996 |

* cited by examiner

PISTON BOWL GEOMETRY, CUFF AND TOP LAND INTERACTION FOR REDUCED HYDROCARBONS, IMPROVED COMBUSTION EFFICIENCY, AND PISTON TEMPERATURE

TECHNICAL FIELD

The present disclosure relates generally to pistons that are used in internal combustion engines having a contoured piston bowl geometry or modified top land geometry mating with a cuff. More specifically, the present disclosure relates to a piston having a contoured piston bowl geometry and/or a cuff and top land interaction for reduced unburned hydrocarbons, improved combustion efficiency, reduced piston temperature, and reduced carbon deposits on the piston surface.

BACKGROUND

Internal combustion engines are routinely used in various industries to power machines and equipment. Examples of industries using such machines and equipment include marine, earth moving, construction, mining, locomotive and agriculture industries, etc. In certain markets and market segments, internal combustion engines with a high power density are needed or employed. Such engines are sometimes challenged by unburned hydrocarbon emissions, decreased combustion efficiency, high piston temperatures, carbon buildup on combustion chamber surfaces including the top land of the side of the piston, etc.

More specifically, it has been traditionally found that a tradeoff or compromise exists between the reducing the heat flux into the piston or other components exposed to the combustion chamber, and reducing the number of unburned hydrocarbons, increasing combustion efficiency, and reducing carbon deposits on the piston surface simultaneously. In some cases, the limits for emissions of unburned hydrocarbons are undesirably approached, risking exceeding these limits.

U.S. Pat. No. 9,938,925 to Morgan et al. discloses a cylinder liner assembly for inclusion in the cylinder bore of an internal combustion engine that includes a sleeve-like cylinder liner, and an anti-polishing ring to scrape combustion deposits from reciprocating piston. A fire dam may axially protrude from a first liner end of the cylinder liner and may have an obliquely angled chamfer disposed thereon. The anti-polishing ring includes matching geometry that is triangularly shaped and an angled undercut that abuts the chamfer. The disclosed piston bowl geometry in the 925 patent includes a reentrant surface.

As can be seen, the piston and anti-polishing ring design of Morgan et al. eases assembly and helps to remove carbon deposits, but it does not address some of the current design tradeoffs such as reducing piston temperature and reducing the emissions of unburned carbons simultaneously.

SUMMARY OF THE DISCLOSURE

A combustion chamber of an engine according to an embodiment of the present disclosure may define an axis of reciprocation, and a radial direction that is perpendicular thereto. The combustion chamber may comprise a cylinder liner defining a bore of the engine with a bore diameter, and an axially upper and radially inner counterbore defining a counterbore axial depth, as well as a piston that is configured to reciprocate in the bore of the engine. The piston may include a crown portion, and in a plane containing the longitudinal axis and the radial direction, the crown portion may include a radially outer lip portion, and a swirl pocket that extends radially from the radially outer lip portion and that defines a lower axial extremity that is spaced axially away from the radially outer lip portion a first axial distance. The swirl pocket may include a convex arcuate surface extending axially downwardly and radially inwardly from the radially outer lip portion, and a concave arcuate surface extending axially downwardly to the lower axial extremity, and radially inwardly from the convex arcuate surface. A conical portion extends axially upwardly and radially inwardly from the concave arcuate surface to an apex, the apex being spaced a second axial distance from the radially outer lip portion that is less than the first axial distance. the convex arcuate surface and the concave arcuate surface may extend radially away from the axially upper and radially inner counterbore along the entirety of the counterbore axial depth.

A cylinder liner according to an embodiment of the present disclosure may comprise an annular body defining a longitudinal axis, and a radial direction, an upper axial extremity disposed along the longitudinal axis, a lower axial extremity disposed along the longitudinal axis, a central thru-bore that extends from the upper axial extremity, to the lower axial extremity, defining a bore cylindrical surface with a bore diameter, and a flange that extends radially outwardly at the upper axial extremity, defining an axially downwardly facing shelf surface. The bore cylindrical surface may define an annular counterbore that extends axially downwardly from the upper axial extremity, defining a counterbore axial depth. A ratio of the counterbore axial depth to the bore diameter may range from 0.115 to 0.125.

An anti-polishing ring according to an embodiment of the present disclosure may comprise a ring body defining an axis of revolution, a radial direction that is perpendicular to the axis of revolution, and a circumferential direction about the axis of revolution. The ring body may include an outer circumferential surface, a bottom surface, a top surface, and an inner circumferential surface. The inner circumferential surface may define an inner diameter, while the ring body may define a radial thickness measured from the inner circumferential surface to the outer circumferential surface. A ratio of the radial thickness to the inner diameter may ranges from 0.015 to 0.020.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a piston that may be used in an internal combustion engine with or without a cooling gallery, and a crown portion with a piston bowl geometry according to various embodiments of the present disclosure will now be described. Also, embodiments of a combustion chamber with a cylinder liner, and a cuff that may reduce carbon deposits will be discussed. These combination of features may provide reduced piston temperatures, reduced unburned hydrocarbons, and improved combustion efficiency when the engine is operated at is its rated load.

Figure 1:
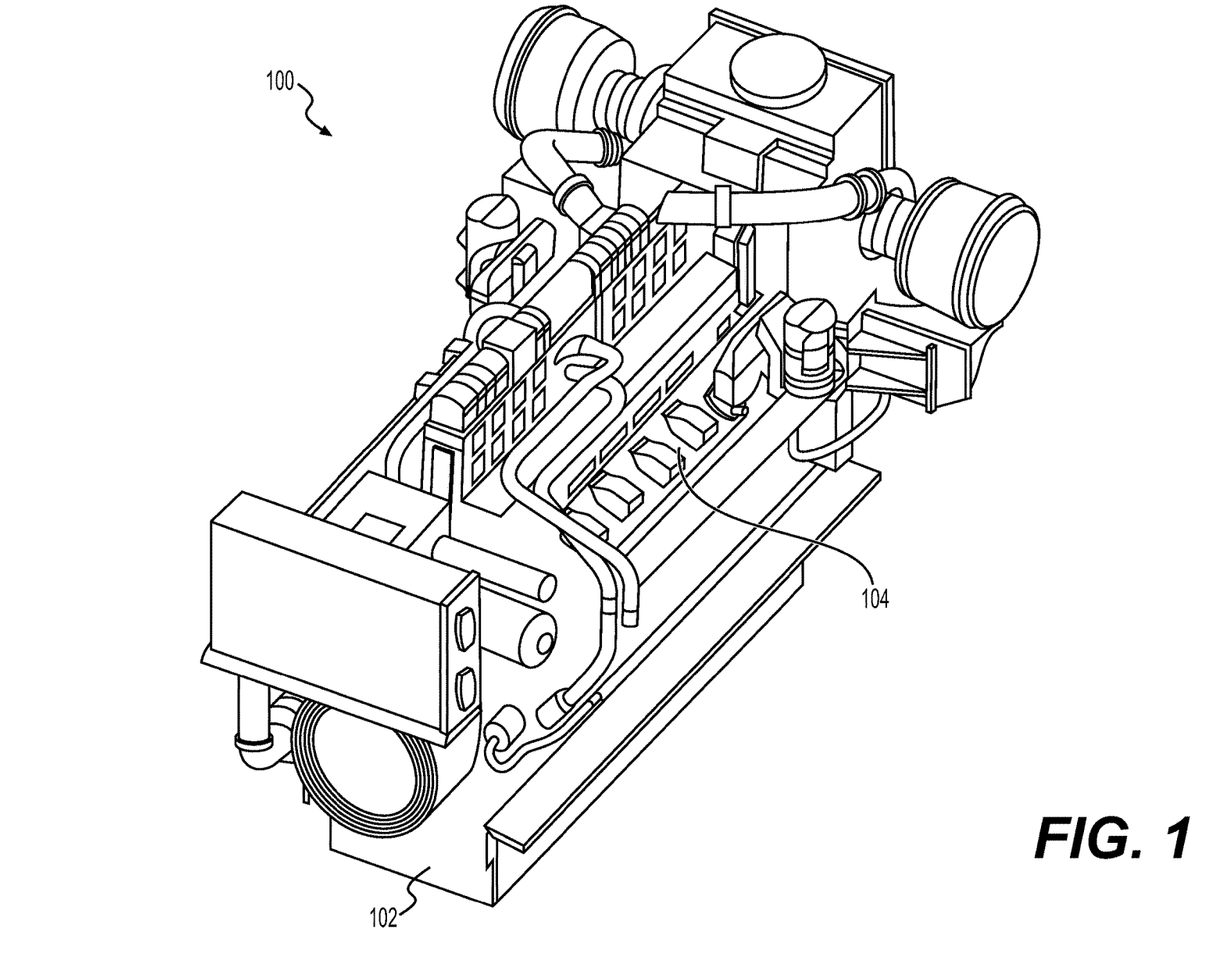
FIG. 1 is a perspective view of an internal combustion engine that may employ pistons, and/or cuffs, and top land interaction according to various embodiments of the present disclosure.

For example, an internal combustion engine 100 is shown in FIG. 1 that may employ various embodiments of the piston constructed according to the principles set forth herein. The engine 100 may include an engine block 102 in which the piston (not shown) reciprocates, and a cylinder head 104 that may contain various engine components for the introduction of fluids into the bore/combustion chamber located in the engine block 102.

Figure 2:
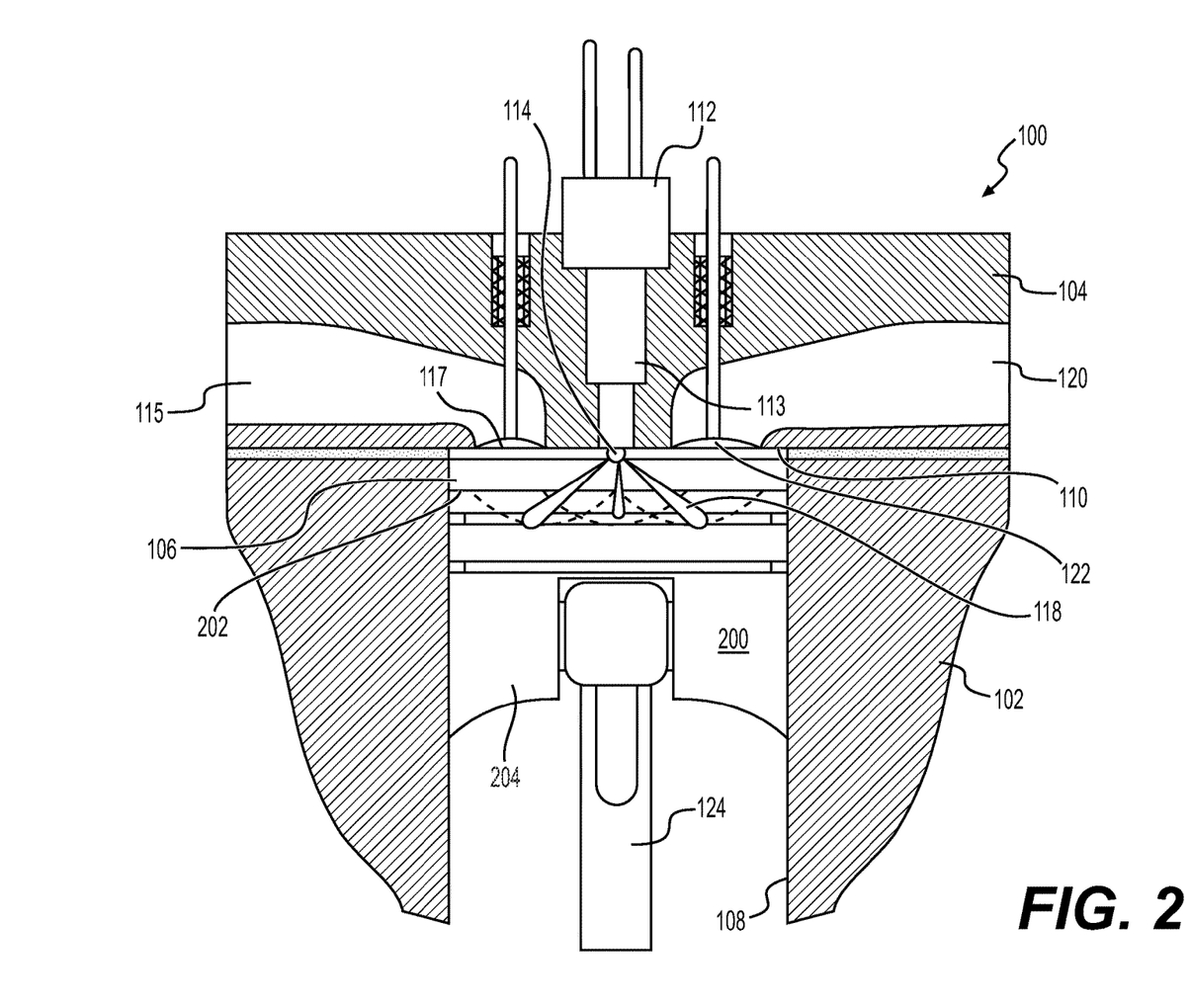
FIG. 2 is a sectioned side view of the internal combustion engine of FIG. 1, showing generically a combustion chamber with a piston that may be configured according to an embodiment of the present disclosure that is disposed in a cylinder bore for reciprocating movement therein.

Turning to FIG. 2, a portion of the engine 100 is shown sectioned, revealing the combustion chamber 106 that may have a generally cylindrical shape that is defined within a cylinder bore 108 formed within the crankcase or engine block 102 of the engine 100. The combustion chamber 106 is further defined at one end by a flame deck surface 110 of the cylinder head 104, and at another end by a crown portion 202 of a piston 200 that is reciprocally disposed within the bore 108, and is connected to a connecting rod 124 at its connecting rod attachment portion 204, which in turn is connected to a crank shaft (not shown). A fuel injector or pre-chamber 112 is mounted in the cylinder head 104. The pre-chamber 112 has a tip 114 that protrudes within the combustion chamber 106 through the flame deck surface 110 such that it can directly inject fuel or jets of burning gases 118 into the combustion chamber 106.

During operation of the engine 100, air is admitted into the combustion chamber 100 and the pre-chamber 112 via an air inlet passage 115 when one or more intake valves 117 (one shown) are open during an intake stroke. In a known configuration, high pressure fuel is permitted to flow into the pre-chamber 112 to mix with the intake air to create a pre-determined fuel/air mixture. A spark is created by a spark plug 113 to ignite the mixture. As the burning fuel and air expand, the holes 114 in the bottom of the pre-chamber allowing jets of burning gases 118 to enter the combustion chamber 106, and fully ignite the fuel and air that creates the power stroke. Following combustion, exhaust gas is expelled from the combustion chamber through an exhaust conduit 120 when one or more exhaust valves 122 (one shown) is/are open during an exhaust stroke.

While a gas engine has been just described in detail, it is to be understood that the embodiments described herein may also be used in diesel and/or compression ignition engines.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 106 during a combustion event due to insufficient mixing, may lead to higher nitrogen oxides and unburned carbon emissions and lower combustion efficiency.

Figure 3:
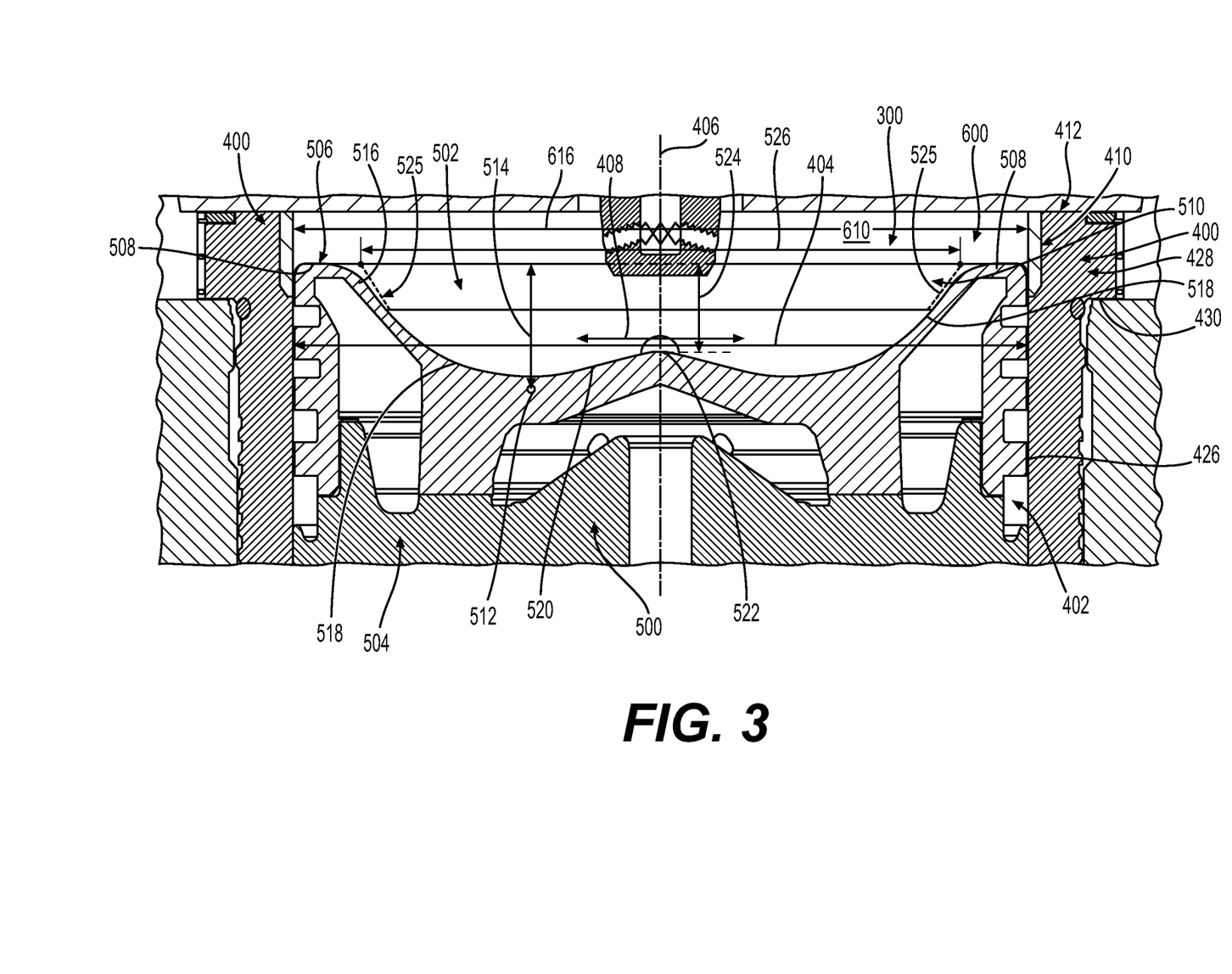
FIG. 3 is an enlarged sectioned side view of the combustion chamber that may be employed in the engine of FIGS. 1 and 2, showing the piston bowl geometry, cuff (may also be referred to an anti-polishing ring), and top land of the side of the piston more geometry more clearly.

FIG. 3 illustrates a combustion chamber 300 similar to that just described but with more detail, including a piston 400 that may be configured according to various embodiments of the present disclosure.

The combustion chamber 300 may comprising an annular cylinder liner 400 defining a bore 402 of the engine with a bore diameter 404, a longitudinal axis 406, and a radial direction 408 that is perpendicular to the longitudinal axis 406.

A piston 500 is also provided that is configured to reciprocate in the bore 402 of the engine, including a crown portion 502, and a connecting rod attachment portion 504 as previously described herein. The crown portion 502 and the connecting rod attachment portion 504 are shown to be separate pieces but may be integral or unitary in other embodiments of the present disclosure (e.g., see FIG. 2).

FIG. 3 shows a sectioned plane containing the longitudinal axis 406, and the radial direction 408. The crown portion 502 includes a radially outer lip portion 506 defining a planar squish surface 508 (so called since gases are squished between this surface and the cylinder head, may not be planar in other embodiments of the present disclosure), and a swirl pocket 510 (so called since it promotes mixing and atomization of the fuel in the air to help improve combustion efficiency) that extends radially inwardly from the radially outer lip portion 506, and axially downwardly, defining a lower axial extremity 512 that is spaced axially away from the radially outer lip portion 506 a first axial distance 514.

The swirl pocket 510 may include a convex arcuate surface 516 that extends axially downwardly and radially inwardly from the radially outer lip portion 506, as well as a concave arcuate surface 518 extending axially downwardly and radially inwardly from the convex arcuate surface 516 to the lower axial extremity 512. A conical portion 520 (may be slightly convex or concave in some embodiments) may extend axially upwardly and radially inwardly from the concave arcuate surface 518 to an apex 522. The apex 522 may be disposed at the longitudinal axis 406 (but not necessarily so), and may be spaced a second axial distance 524 from the radially outer lip portion that is less than the first axial distance 514, such that the apex 522 is at a level that is below the planar squish surface 508 of the radially outer lip portion 506.

A theoretical circle may be constructed by intersecting a tangent 525 to the concave arcuate surface 518 that extends from its connection with the convex arcuate surface 516 until it crosses the axial level of the planar squish surface 508. This theoretical circle may thus be characterized as defining an effective bowl rim diameter 526. A ratio of bowl rim diameter 526 to the bore diameter 404 may range from 0.805 to 0.815 (e.g., 0.810) in various embodiments of the present disclosure. Other ratios are possible in other embodiments of the present disclosure.

As used herein, the term "arcuate" means any surface that is not conical or planar, and may include a radius, radii, an ellipse, a spline, a polynomial, etc.

It should be noted that the swirl pocket 510 lacks a reentrant surface. A reentrant surface is a surface the is angled axially downwardly, forming an undercut along the longitudinal axis 406. As a result, combustion gases will flow axially upwardly and radially outwardly toward the cylinder liner 400.

Figure 6:
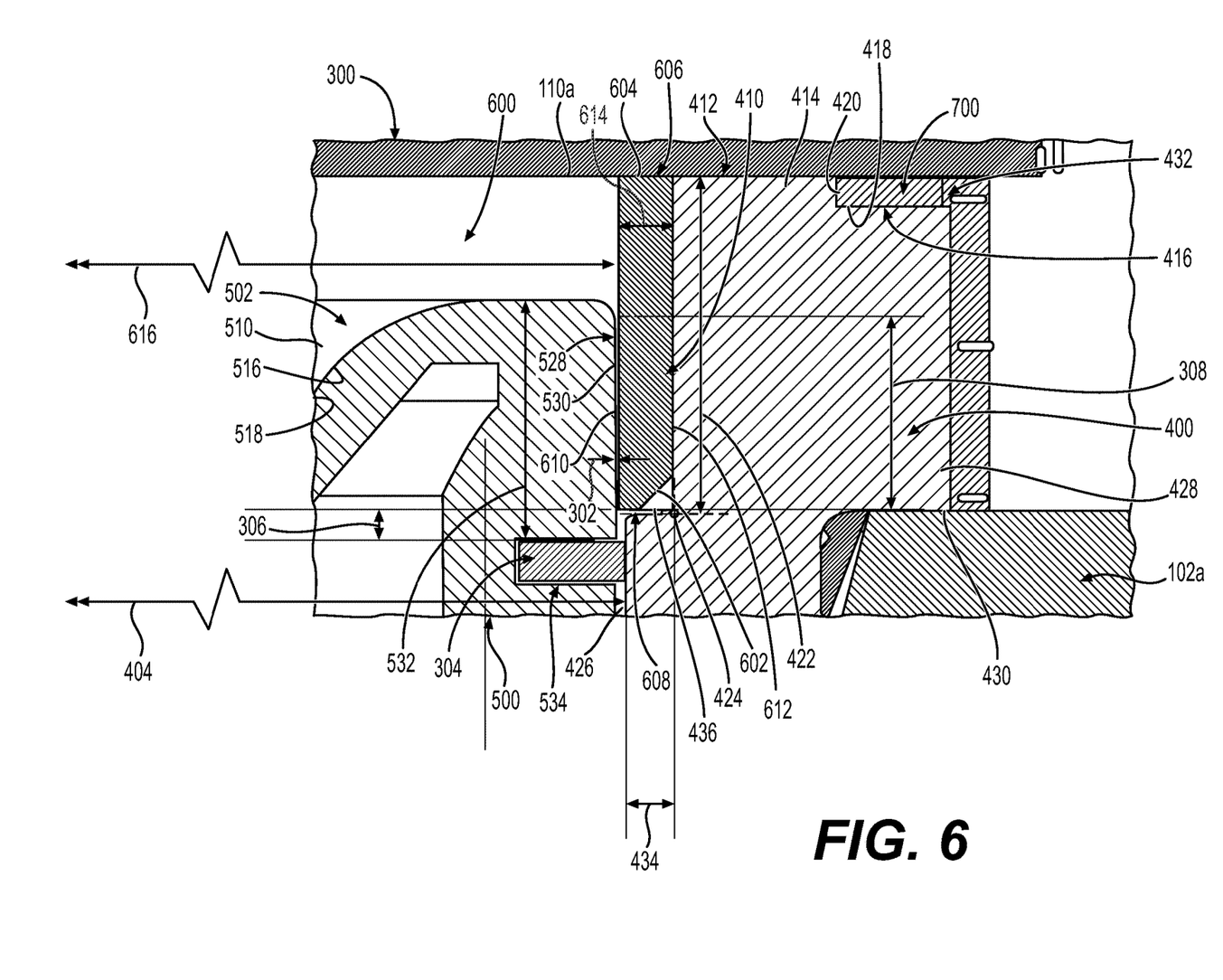
FIG. 6 is an enlarged sectioned view showing the cuff, and top land geometry of FIG. 3 more clearly.

Looking at FIGS. 3 and 6 together, it can be seen that the cylinder liner 400 defines an axially upper and radially inner counterbore 410. A cuff 600 may be disposed (via a press fit, or slip fit, etc.) in the axially upper and radially inner counterbore 410. The cuff may remove carbon deposits from the outer surface of the piston as it reciprocates since it is slightly radially proud as compared to the bore diameter (see FIG. 6).

As best seen in FIG. 6, the cuff 600 may define an axially lower and radially outer chamfer 602 to help avoid corner interference with the counterbore 410 during assembly. As a result, the cuff 600 is fully seated with its top surface 604 flush or nearly flush with the upper axial extremity 412 of the cylinder liner 400. This upper axial extremity 412 may include a fire dam 414, that protects the gasket 700 that is disposed in the axially upper and radially outer annular cavity 416 of the cylinder liner 400 from the hot combustion gases.

More specifically, it can be seen that the axially upper and radially outer annular cavity 416 may include an axially extending surface 418, and a radially extending surface 420 that extends radially from 418. The gasket 700 may contact both the axially extending surface 418, and the radially extending surface 420 after being compressed by the cylinder head 104a (see also flame deck surface 110a) during assembly of the engine block 102a.

Figure 4:
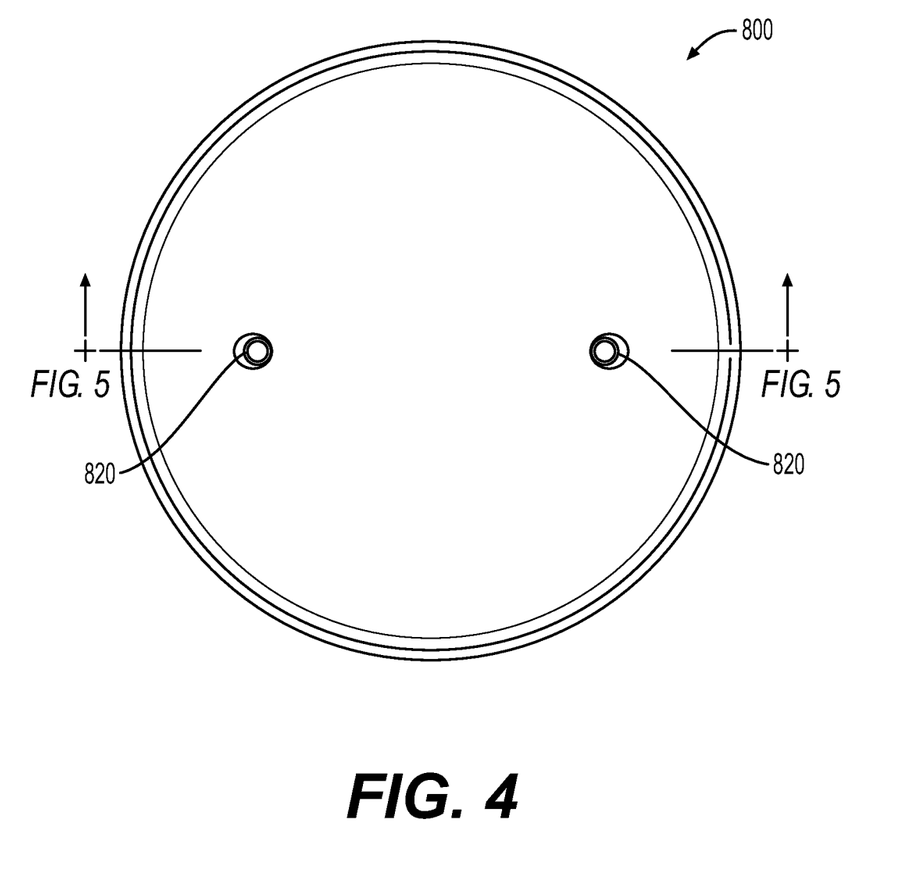
FIG. 4 is top view of a piston similar to that of FIG. 3 that may be employed in FIG. 3.
Figure 5:
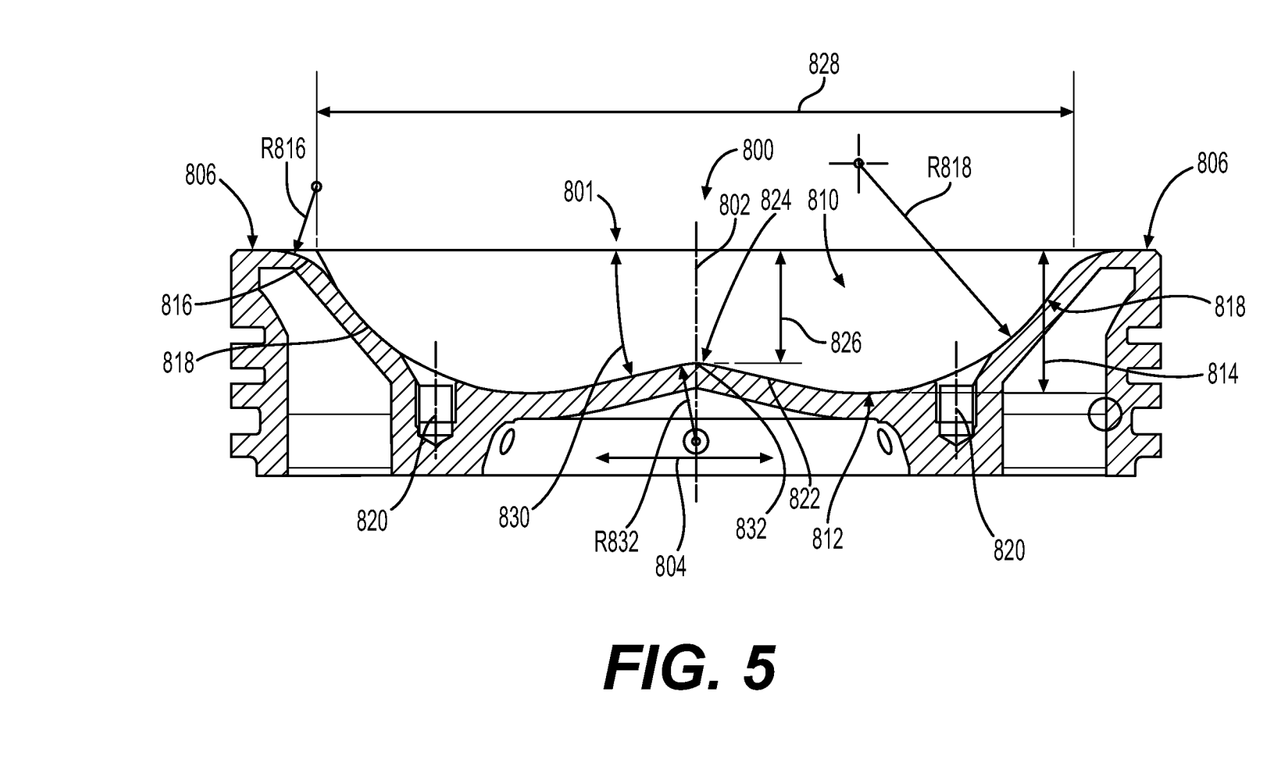
FIG. 5 is a sectional view of the piston of FIG. 4, taken along lines 5-5 thereof.

FIG. 5 illustrates another piston 800 that may be substituted for piston 500, or vice versa. Piston 800 has a swirl pocket 810 that may have slightly different contours than that of piston 500, a different aspect ratio, and a concave arcuate surface 818 that defines at least one tapped hole 820 (e.g., ½"-13 UNC-18) extending axially downwardly from the concave arcuate surface 818, etc. This tapped hole 820 may be disposed radially between the lower axial extremity 812, and the radially outer lip portion 806. These tapped holes (two shown in FIGS. 4 and 5) may be used during assembly, disassembly, and manufacture of the piston. These tapped holes may be omitted in other embodiments of the present disclosure.

Since any of the pistons discussed herein may be supplied as a retrofit or a replacement part, piston 800 will now be discussed in further detail without reference to the combustion chamber.

Looking at FIG. 5, the piston 800 may comprise an annular body 801 including a crown portion (e.g., similar to 502 in FIG. 3) defining a longitudinal axis 802 (may also be referred to as an axis of revolution since the body may be modeled in CAD or manufactured using a turning process, etc.), and a radial direction 804 that is perpendicular to the longitudinal axis 802. FIG. 5 shows a sectioned plane containing the longitudinal axis 802, and the radial direction 804, illustrating the contoured combustion bowl.

More particularly, a swirl pocket 810 extends radially inwardly and axially downwardly from the radially outer lip portion 806, defining a lower axial extremity 812 that is spaced axially away from the radially outer lip portion 806 a first axial distance 814. Also, the swirl pocket 810 may include a convex arcuate surface 816 extending axially downwardly and radially inwardly from the radially outer lip portion 806. Moreover, a concave arcuate surface 818 may extend axially downwardly to the lower axial extremity 812, and radially inwardly from the convex arcuate surface 816. A conical portion 822 may extend axially upwardly and radially inwardly from the concave arcuate surface 818 to an apex 824. The apex 824 may be spaced a second axial distance 826 from the radially outer lip portion 806. In some embodiments, a ratio of the second axial distance 826 to the first axial distance 814 may range from 0.780 to 0.820 (e.g., 0.794). In such a case, the first axial distance 814 may range from 40.0 mm to 50.0 mm (e.g., 46.6 mm), and the second axial distance may range from 35.0 millimeters to 40.0 millimeters (e.g., 37.0 mm). Other ratios and dimensions are possible in other embodiments of the present disclosure.

The radially outer lip portion 806 may define a bowl rim diameter 828 in a manner as previously described herein. A ratio of the first axial distance 814 to the bowl rim diameter 828 may range from 0.180 to 0.210 (e.g., 0.192) in some embodiments of the present disclosure. In such an embodiment, the bowl rim diameter 828 may range from 235.0 mm to 250.0 mm (e.g., 242.95 mm), and the conical portion 822 may form an angle 830 with the radial direction 804 ranging from 10.0 degrees to 15.0 degrees (e.g., 13.1 degrees). Other ratios and dimensions are possible in other embodiments of the present disclosure.

In some embodiments, the convex arcuate surface 816 defines a convex radius of curvature R816 in the plane containing the longitudinal axis 802, and the radial direction 804, ranging from 20.0 mm to 30.0 mm (e.g., 25.0 mm). The concave arcuate surface 818 may define a concave radius of curvature R818 in the plane, ranging from 70.0 mm to 80.0 mm (e.g., 74.2 mm).

With continued reference to FIG. 5, other embodiments of a replacement piston 800 with a crown portion may be characterized as follows.

The apex 824 may be spaced a second axial distance 826 from the radially outer lip portion 806 that is less than the first axial distance 814, and a ratio of the first axial distance 814 to the bowl rim diameter 828 may range from 0.185 to 0.197 (e.g., 0.192).

In such a case, a ratio of the second axial distance 826 to the first axial distance 814 may range from 0.790 to 0.800 (e.g., 0.794). When true, the first axial distance 814 may range from 40.0 mm to 50.0 mm, while the second axial distance 826 may range from 35.0 millimeters to 40.0 millimeters as previously alluded to herein.

When the ratio of the first axial distance to the bowl rim diameter falls within the range of 0.185 to 0.197, any combination of the following geometric constraints may also be present. The convex radius of curvature R816 in the plane may range from 20.0 mm to 30.0 mm, while the concave radius of curvature R818 in the plane may range from 70.0 mm to 80.0 mm.

In some embodiments, the apex 824 may be defined by a convex radius 832 defining an apex radius of curvature R832 that may range from 20.0 mm to 30.0 mm (e.g., 25.0 mm). In other embodiments, the apex may be defined by a flat surface, etc.

Next, a combustion chamber that is designed to improve combustion efficiency, decrease carbon deposits, and reduce unburned hydrocarbons in some applications can be described as follows.

Looking at FIGS. 3 and 6 together, such a combustion chamber 300 of an engine defining an axis of reciprocation (may essentially be the same as the longitudinal axis 406 of the cylinder liner 400), and a radial direction (may essentially be the same as the radial direction 408 defined by the cylinder liner 400). As alluded to earlier herein, a cylinder liner 400 may be disposed in the bore of the engine block, and may define a bore 402 of the engine with a bore diameter 404, and may define an axially upper and radially inner counterbore 410 that define a counterbore axial depth 422.

A piston 500 may be disposed in the bore 402 that is configured to reciprocate therein. The piston 500 may include a crown portion 502 with a radially outer lip portion 506, and a swirl pocket 510 that extends radially from the radially outer lip portion 506 axially downwardly to a lower axial extremity 512 of the swirl pocket 510. This lower axial extremity is spaced axially away from the radially outer lip portion 506 a first axial distance 514. Also, the swirl pocket 510 includes a convex arcuate surface 516 extending axially downwardly and radially inwardly from the radially outer lip portion 506, a concave arcuate surface 518 extending axially downwardly to the lower axial extremity 512, and radially inwardly from the convex arcuate surface 516 to a conical portion 520. The conical portion 520 may extend axially upwardly and radially inwardly from the concave arcuate surface 518 to an apex 522 that is spaced a second axial distance 524 from the radially outer lip portion 506 that is less than the first axial distance 514. This may not be the case in other embodiments of the present disclosure. Also, another conical surface may connect the convex arcuate surface to the concave arcuate surface in some embodiments of the present disclosure.

Focusing on FIG. 6, the convex arcuate surface 516, and the concave arcuate surface 518 extend radially away from the axially upper and radially inner counterbore 410 of the cylinder liner along the entirety of the counterbore axial depth 422. This may not be the case for other embodiments of the present disclosure. As also mentioned earlier herein, a cuff 600 may be disposed in the axially upper and radially inner counterbore 410 of the cylinder liner 400.

The cuff 600 may define an upper axial extremity 606, a lower axial extremity 608, and may include a radially inner cylindrical surface 610, and a radially outer cylindrical surface 612. The counterbore 410 defines a corner 424 that is typically made using a milling or turning operation. Consequently, the corner 424 is not completely sharp but typically has a radius there. So, the cuff 600 includes a chamfer 602 at its lower axial extremity 608 leading from the radially outer cylindrical surface 612 proximate to the corner 424, avoiding any corner to corner interference during assembly.

Looking at FIGS. 3 and 6 together again, a ratio of the counterbore axial depth 422 to the bore diameter 404 may range from 0.115 to 0.125 (e.g., 0.119) in some embodiments of the present disclosure. Also, the cuff 600 may also define a radial thickness 614, and a ratio of the radial thickness 614 to the bore diameter 404 may range from 0.015 to 0.025 (e.g., 0.020) in certain embodiments. In some embodiments, the bore diameter 404 may be about 300.025 mm and the counterbore axial depth 422 may be about 35.75 mm.

In further embodiments, the radially inner cylindrical surface 610 of the cuff 600 defines a cuff inner diameter 616, and a ratio of the cuff inner diameter 616 to the bore diameter 404 may range from 0.995 to 0.999. In such a case, the piston 500 may include a radially outer surface 528 including a top land surface 530 (may be cylindrical or slightly tapered/or conical with a reduced diameter at the top) extending axially downwardly from the radially outer lip portion 506. The top land surface 530 may define a top land axial height 532 that ranges from 20.0 mm to 25.0 mm (e.g., 22.5 mm, see FIG. 6). In some embodiments, the cuff inner diameter may be about 298.975 mm.

In addition, a radial clearance 302 may be defined between the radially inner cylindrical surface 610 of the cuff 600 to the top land surface 530 of the piston 500 that ranges from 0.785 mm to 0.795 mm (e.g., 0.788 mm) at the top if surface 530 is tapered, and from 0.650 mm to 0.750 mm (e.g., 0.699 mm) at the bottom of the axial overlap 308. Also, the radially outer cylindrical surface 528 of the piston 500 may define at least a top piston ring groove 534 with a top piston ring 304 disposed therein. An axial clearance 306 from the top piston ring 304 to the cuff 600 (e.g., to the lower axial extremity 608) may range from 2.350 mm to 2.360 mm (e.g., 2.353 mm) in some embodiments of the present disclosure.

Furthermore, a ratio of the top land axial height 532 to the bore diameter 404 may range from 0.080 to 0.085 (e.g., 0.083) in some embodiments of the present disclosure. In such a case, the cuff 600 may define an axial overlap 308 (may also be called "engagement") with the top land axial height 532, and a ratio of the axial overlap 308 to the top land axial height 532 may range from 0.900 to 0.910 (e.g., 0.906) when the piston 500 is disposed at its top dead center position in the bore 402 (top dead center position of the piston is shown in FIGS. 3 and 6).

Now, a cylinder liner 400 that may be provided as a retrofit or a replacement part used with the combustion chamber 300 described herein may be characterized as follows. It should be noted that the cylinder liner may be provided by itself or with other components such as a kit that may include a cuff or an anti-polishing ring, etc. in an assembled or unassembled state.

With continued reference to FIGS. 3 and 6, such a cylinder liner 400 may comprise an annular body defining a longitudinal axis 406, and a radial direction 408. An upper axial extremity 412, and a lower axial extremity (not shown in FIGS. 3 and 6 but understood to be present when looking at FIG. 2) may be disposed along the longitudinal axis 406. A central thru-bore (e.g., see 402) that extends from the upper axial extremity 412, to the lower axially extremity, may define a bore cylindrical surface 426 with a bore diameter 404. A flange 428 may extend radially outwardly at the upper axial extremity 412, defining an axially downwardly facing shelf surface 430. This shelf surface rests on the engine block 310.

The bore cylindrical surface 426 defines an annular counterbore (e.g., see 410) that extends axially downwardly from the upper axial extremity 412, defining a counterbore axial depth 422. A ratio of the counterbore axial depth 422 to the bore diameter 404 may range from 0.115 to 0.125 in some embodiments of the present disclosure.

Also, the upper axial extremity 412 may define a gasket receiving groove 432 facing axially upwardly that is disposed axially above the axially downwardly facing shelf surface 430. A fire dam 414 may be disposed radially between the annular counterbore (e.g., see 410), and the gasket receiving groove 432. The fire dam 414 may help protect the gasket from hot combustion gases.

As best seen in FIG. 6, the annular counterbore defines a radial depth 434, and a ratio of the radial depth 434 to the bore diameter 404 may range from 0.015 to 0.020 (e.g., 0.018) in some embodiments of the present disclosure. In such a case, the radial depth 434 may be about 5.4 mm. In addition, the annular counterbore defines a bottom surface 436 that does not extend and is not disposed axially below the axially downwardly facing shelf surface 430. Put another way, the bottom surface 436 of the counterbore is at the same or higher axial level than the shelf surface 430. This may not be the case for other embodiments of the present disclosure.

Similarly, an anti-polishing ring that may be supplied as part of a kit or separately for retrofitting or repair will now be described.

Figure 7:
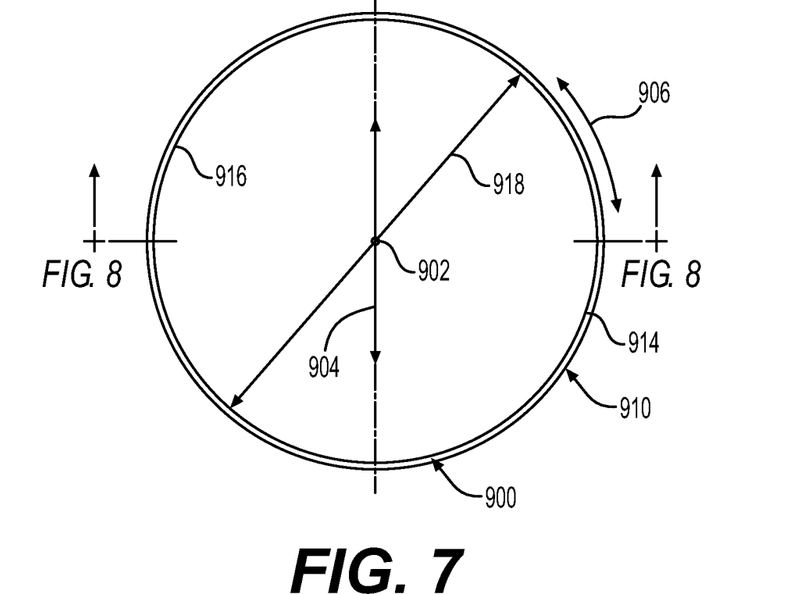
FIG. 7 is a top view of the cuff of FIG. 6, shown in isolation.
Figure 8:
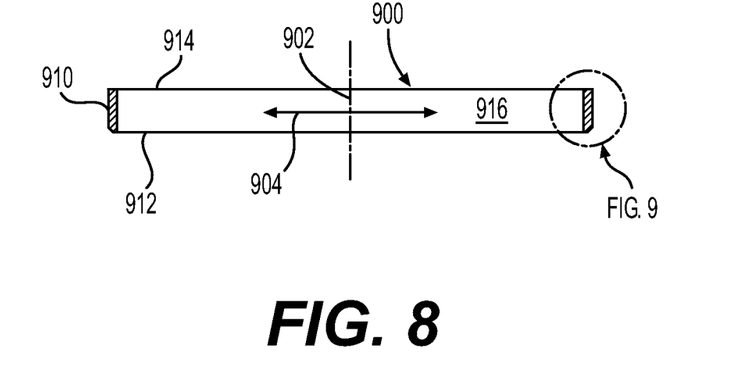
FIG. 8 is a sectional view of the cuff of FIG. 7, taken along lines 8-8 thereof.
Figure 9:
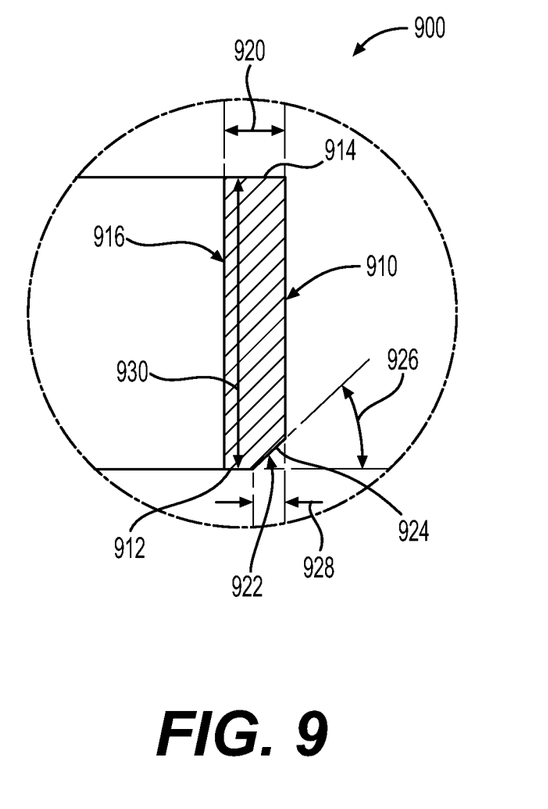
FIG. 9 is an enlarged detail view of the cross-section of FIG. 8, showing the geometry of the cuff in more detail.

Turning now to FIGS. 7 thru 9, an anti-polishing ring 900 may comprise a ring body defining an axis of revolution 902 (so called since the ring may be modeled in CAD (computer aided drafting) or manufactured using a turning operation on a lathe or the like, etc.), and a radial direction 904 that is perpendicular to the axis of revolution 902, as well as a circumferential direction 906 extending about the axis of revolution 902. The ring body includes an outer circumferential surface 910, a bottom surface 912, a top surface 914, and an inner circumferential surface 916.

The inner circumferential surface 916 defines an inner diameter 918, while the ring body defines a radial thickness 920 (see FIG. 9) measured from the inner circumferential surface 916 to the outer circumferential surface 910.

A ratio of the radial thickness 920 to the inner diameter 918 may range from 0.015 to 0.020 in some embodiments of the present disclosure. Moreover, the ring body defines a transitional surface 922 (e.g., a fillet, a chamfer, etc.) that extends from the outer circumferential surface 910 to the bottom surface 912.

As shown in FIG. 9, the transitional surface 922 may take the form of a chamfer 924 forming an acute angle 926 with the radial direction 904 ranging from 40.0 degrees to 50.0 degrees (e.g., 45.0 degrees), and defining a radial chamfer dimension 928 that is greater than 2.0 mm (e.g., greater than 2.5 mm) in some embodiments of the present disclosure.

Furthermore, the ring body defines a ring axial height 930, and a ratio of the ring axial height 930 to the inner diameter 918 may range from 0.115 to 0.121 in some embodiments of the present disclosure. In such a case, the ring axial height 930 may range from 35.0 mm to 36.0 mm (e.g., 35.55 mm).

The configuration, ratios and dimensional ranges of any of the features of any of the embodiments discussed herein may be altered to be different than what has been explicitly discussed or shown depending on the application.

The piston may be fabricated from steel (e.g., tool steel, stainless steel, etc.), cast aluminum alloy, forged aluminum alloy or other suitable material that is durable, corrosion resistant, etc. The geometry of the crown portion may be formed during the casting or forging process and then may be rough machined and/or finish machined if necessary. Suitable machining processes may include milling, turning, electrical discharge machining, etc. The cylinder liner and the anti-polishing ring (or cuff) may be manufactured using the same materials and the same processes as the piston.

Since a turning process is used to create some or all of the finished geometry of the piston, the cylinder liner, and the anti-polishing ring (or cuff), it can be readily understood by one skilled in the art that most or almost all of the finished geometry of these components may not vary, or may not vary significantly, along the circumferential direction.

INDUSTRIAL APPLICABILITY

In practice, a piston, a crown portion of a piston, a combustion chamber, a cuff or anti-polishing ring, a cylinder liner, and/or an engine assembly using any of these components according to any embodiment described herein may be provided, sold, manufactured, and bought etc. as needed or desired in an aftermarket or OEM (original equipment manufacturer) context. For example, a crown portion or a piston as well as a cylinder liner assembly with a cuff may be used to retrofit an existing engine already in the field or may be sold with an engine or a piece of equipment using that engine at the first point of sale of the piece of equipment.

The inventors have found that these embodiments may provide improvements in engines via single cylinder engine tests. Since the piston bowl rim is angled radially outwardly towards the cylinder liner and piston rings, one skilled in the art would expect oil depositing and increased temperatures for these components to occur. However, the cuff or anti-polishing ring may help force combustion products up and away from the piston rings and cylinder liner, which negates these expected negative impacts of the design.

As can be seen, various embodiments of the present disclosure break the tradeoff between reducing component temperatures and improving combustion efficiency simultaneously that is found in the prior art as discussed above in the "Background" section herein.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A combustion chamber of an engine defining an axis of reciprocation, and a radial direction that is perpendicular thereto, the combustion chamber comprising:
    a cylinder liner defining a bore of the engine with a bore diameter, and an axially upper and radially inner counterbore defining a counterbore axial depth; and
    a piston configured to reciprocate in the bore of the engine, the piston including
        a crown portion wherein in a plane containing the axis of reciprocation and the radial direction, the crown portion includes a radially outer lip portion, and
        a swirl pocket that extends radially from the radially outer lip portion and defines a lower axial extremity that is spaced axially away from the radially outer lip portion a first axial distance, and the swirl pocket includes a convex arcuate surface extending axially downwardly and radially inwardly from the radially outer lip portion, a concave arcuate surface extending axially downwardly to the lower axial extremity, and radially inwardly from the convex arcuate surface, a conical portion that extends axially upwardly and radially inwardly from the concave arcuate surface to an apex, the apex being spaced a second axial distance from the radially outer lip portion that is less than the first axial distance, and the convex arcuate surface and the concave arcuate surface extend radially away from the axially upper and radially inner counterbore along the entirety of the counterbore axial depth,
    wherein a ratio of the counterbore axial depth to the bore diameter ranges from 0.115 to 0.125.

2. The combustion chamber of claim 1, further comprising a cuff that is disposed in the axially upper and radially inner counterbore of the cylinder liner,
    the cuff defining an upper axial extremity, and a lower axial extremity,
    the cuff including a radially inner cylindrical surface, and a radially outer cylindrical surface.

3. The combustion chamber of claim 2, wherein the axially upper and radially inner counterbore of the cylinder liner defines a corner, and the cuff includes a chamfer at its lower axial extremity leading from the radially outer cylindrical surface, proximate to the corner.

4. The combustion chamber of claim 2, wherein the cuff defines a radial thickness, and a ratio of the radial thickness to the bore diameter ranges from 0.015 to 0.025.

5. The combustion chamber of claim 4, wherein the radially inner cylindrical surface of the cuff defines a cuff inner diameter, and a ratio of the cuff inner diameter to the bore diameter ranges from 0.995 to 0.999.

6. The combustion chamber of claim 5, wherein the piston includes a radially outer surface including a top land surface extending axially downwardly from the radially outer lip portion, and the top land surface defines a top land axial height that ranges from 20.0 mm to 30.0 mm.

7. The combustion chamber of claim 6, wherein a radial clearance is defined between the radially inner cylindrical surface of the cuff to the top land surface of the piston that ranges from 0.650 mm to 0.795 mm,
    the radially outer cylindrical surface of the piston defines at least a top piston ring groove with a top piston ring disposed therein, and
    an axial clearance from the top piston ring to the cuff ranges from 2.350 mm to 2.360 mm.

8. The combustion chamber of claim 6, wherein a ratio of the top land axial height to the bore diameter ranges from 0.080 to 0.085.

9. The combustion chamber of claim 8, wherein the cuff defines an axial overlap with the top land axial height, and
    a ratio of the axial overlap to the top land axial height ranges from 0.900 to 0.910 when the piston is disposed at its top dead center position in the bore.

10. A cylinder liner comprising:
    an annular body defining a longitudinal axis and a radial direction, the annular body including
        an upper axial extremity disposed along the longitudinal axis,
        a lower axial extremity disposed along the longitudinal axis,
        a central thru-bore that extends from the upper axial extremity to the lower axial extremity, defining a bore cylindrical surface with a bore diameter, and
        a flange that extends radially outwardly at the upper axial extremity, defining an axially downwardly facing shelf surface,
    wherein the bore cylindrical surface defines an annular counterbore that extends axially downwardly from the upper axial extremity, defining a counterbore axial depth, and
    a ratio of the counterbore axial depth to the bore diameter ranges from 0.115 to 0.125.

11. The cylinder liner of claim 10, wherein the upper axial extremity defines a gasket receiving groove facing axially upwardly that is disposed axially above the axially downwardly facing shelf surface, and further comprising a fire dam that is disposed radially between the annular counterbore and the gasket receiving groove.

12. The cylinder liner of claim 10, wherein the annular body is made from steel.

13. The cylinder liner of claim 10, wherein the annular counterbore defines a radial depth, and a ratio of the radial depth to the bore diameter ranges from 0.015 to 0.020.

14. The cylinder liner of claim 10, wherein the annular counterbore defines a bottom surface that is not disposed axially below the axially downwardly facing shelf surface.

15. An engine, comprising:
    a cylinder liner defining a bore of the engine with a bore diameter, and an axially upper and radially inner counterbore defining a counterbore axial depth, the bore of the engine defining an axis of reciprocation and a radial direction that is perpendicular to the axis of reciprocation; and
    a piston disposed within the bore of the engine and configured to reciprocate along the axis of reciprocation, the piston including
        a crown portion, wherein in a plane containing the axis of reciprocation and the radial direction, the crown portion includes a radially outer lip portion, and
        a swirl pocket that extends radially from the radially outer lip portion and defines a lower axial extremity that is spaced axially away from the radially outer lip portion a first axial distance,
        the swirl pocket including a convex arcuate surface extending axially downwardly and radially inwardly from the radially outer lip portion, a concave arcuate surface extending axially downwardly to the lower axial extremity, and radially inwardly from the convex arcuate surface, a conical portion that extends axially upwardly and radially inwardly from the concave arcuate surface to an apex, the apex being spaced a second axial distance from the radially outer lip portion that is less than the first axial distance, the convex arcuate surface and the concave arcuate surface extending radially away from the axially upper and radially inner counterbore along the entirety of the counterbore axial depth, wherein a ratio of the counterbore axial depth to the bore diameter ranges from 0.115 to 0.125.

16. The engine of claim 15, further comprising a cuff that is disposed in the axially upper and radially inner counterbore of the cylinder liner, the cuff defining an upper axial extremity, and a lower axial extremity, the cuff including a radially inner cylindrical surface, and a radially outer cylindrical surface.

17. The engine of claim 16, wherein the axially upper and radially inner counterbore of the cylinder liner defines a corner, and the cuff includes a chamfer at its lower axial extremity leading from the radially outer cylindrical surface, proximate to the corner.

18. The engine of claim 16, wherein the cuff defines a radial thickness, and a ratio of the radial thickness to the bore diameter ranges from 0.015 to 0.025.

19. The engine of claim 18, wherein the radially inner cylindrical surface of the cuff defines a cuff inner diameter, and a ratio of the cuff inner diameter to the bore diameter ranges from 0.995 to 0.999.

* * * * *